United States Patent [19]

Sugimura et al.

[11] Patent Number: 4,958,287

[45] Date of Patent: Sep. 18, 1990

[54] ELECTRONIC CONTROL SYSTEM FOR AUTOMATIC VEHICLE TRANSMISSION

[75] Inventors: Toshiya Sugimura, Numazu; Hiroshi Yoshimura, Hiroshima, both of Japan

[73] Assignee: Isuzu Motors Limited, Tokyo, Japan

[21] Appl. No.: 207,958

[22] Filed: Jun. 17, 1988

[30] Foreign Application Priority Data

Jun. 20, 1987 [JP] Japan .................................. 62-152429

[51] Int. Cl.⁵ ........................ B60K 41/08; B60K 28/10
[52] U.S. Cl. .................................... 364/424.1; 74/866
[58] Field of Search .................... 364/424.1, 200, 900; 365/229; 74/866

[56] References Cited

U.S. PATENT DOCUMENTS

| | | | |
|---|---|---|---|
| 4,232,377 | 11/1980 | Tallman | 365/229 |
| 4,323,987 | 4/1982 | Holtz et al. | 365/229 |
| 4,467,427 | 8/1984 | Magnusson | 364/424.1 |
| 4,499,542 | 2/1985 | Hamajima et al. | 74/866 |
| 4,580,248 | 4/1986 | Imaizumi | 365/229 |
| 4,635,508 | 1/1987 | Tatsumi | 74/866 |
| 4,658,352 | 4/1987 | Nagasawa | 365/229 |
| 4,667,541 | 5/1987 | Shimaoka et al. | 364/424.1 |
| 4,779,490 | 10/1988 | Milunas et al. | 364/424.1 |
| 4,789,937 | 12/1988 | Yasue et al. | 364/424.1 |
| 4,807,135 | 2/1989 | Tamai | 364/424.1 |

Primary Examiner—Parshotam S. Lall
Assistant Examiner—Christopher L. Makay
Attorney, Agent, or Firm—Staas & Halsey

[57] ABSTRACT

An electronic control system for controlling an automatic transmission determines a gear position based on vehicle speed data immediately before a power supply is cut off. The gear position is determined during a transient period occurring after the electronic control system is reset by the power supply cutoff, until the control system resumes stable operation. Even when the electronic control system is reset by the instantaneous power supply cutoff while the vehicle is travelling, the electronic control system allows the vehicle to run safely without erroneous gear shifting immediately afterwards.

4 Claims, 10 Drawing Sheets

FUNCTIONAL BLOCK OF ELECTRONIC CONTROL SYSTEM 1

FIG. 1

HARDWARE OF ELECTRONIC CONTROL SYSTEM

FIG. 2

AREA MAP OF RAM 202

FIG. 3 OVERALL PROCESSING SEQUENCE

FIG. 4 INITIALIZING PROCESSING SEQUENCE

VEHICLE SPEED PROCESSING SEQUENCE (2)

FIG. 6

GEAR PROCESSING SEQUENCE

FIG. 8

AUTOMOBILE WITH CONVENTIONAL ELECTRONIC CONTROL SYSTEM

FIG. 7

| VARIABLES | CONTENTS |
|---|---|
| SPD:REAL | INTERNAL VALUE (km/h) CONVERTED FROM THE NUMBER OF OUTPUT PULSES FROM VEHICLE SPEED SENSOR WHICH ARE INTRODUCED FOR A FIXED PERIOD OF TIME |
| SPD: | WHEN VEHICLE SPEED SENSOR IS NORMAL, VALUE PRODUCED BY EFFECTING FILTERING PROCESS ON SPD:READ. WHEN VEHICLE SPEED SENSOR IS ABNORMAL, VALUE DETERMINED FROM INPUT SHAFT SPEED AND GEAR RATIO. (km/h) |
| SPEED: | USED TO CALCULATE TARGET GEAR POSITION FROM SPEED CHANGE MAP, AND STORED IN BACKUP RAM FOR STORING DATA AT ALL TIMES |
| ACCEL: | STORING THE AMOUNT OF DEPRESSION OF ACCELERATOR PEDAL |
| RST:TM | TIMER COUNTER FOR COUNTING A FIXED PERIOD OF TIME FROM RESETTING |
| TMR:SPEED | TIMER COUNTER FOR COUNTING TIME UP TO STARTING OF VEHICLE SPEED BACKUP |
| TMR:GR | TIMER COUNTER FOR COUNTING A FIXED PERIOD OF TIME FROM GEAR SHIFT |
| GEAR: | TARGET GEAR POSITION |

MAIN VARIABLES AND THEIR CONTENTS

FIG. 9

FUNCTIONAL BLOCK OF ELECTRONIC CONTROL SYSTEM 1

FIG. 10

PROCESSING SEQUENCE IN PROCESSOR 106

EXAMPLE OF RUNNING PATTERN AT THE TIME OF INSTANTANEOUS POWER SUPPLY CUTOFF

ELECTRONIC CONTROL SYSTEM FOR AUTOMATIC VEHICLE TRANSMISSION

BACKGROUND OF THE INVENTION

The present invention relates to an electronic control system for an automatic vehicle transmission, and more particularly to an electronic control system for controlling a vehicle transmission based on a vehicle speed, an amount of depression of an accelerator pedal, or the like.

Figure 8:
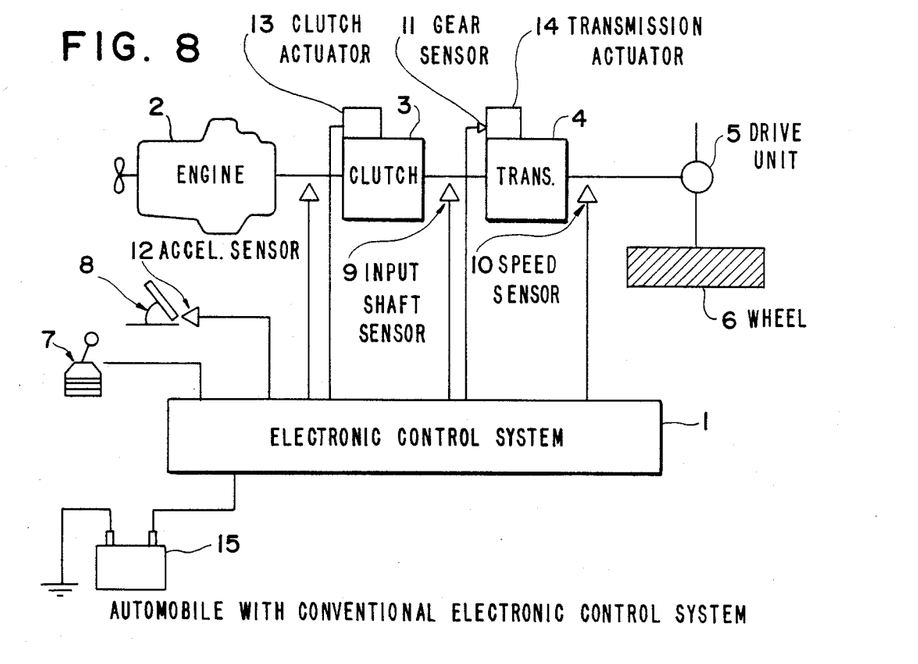
FIG. 8 is a schematic view of an automobile incorporating a conventional electronic control system.

FIG. 8 of the accompanying drawings schematically shows an automobile incorporating a conventional electronic control system 1 for automatically controlling a vehicle transmission.

Denoted in FIG. 8 at 2 is an engine, 3 a clutch, 4 a transmission, 5 a final drive unit, 6 a wheel, 7 a selector lever, and 8 an accelerator pedal. Designated at 9 is an input shaft sensor for detecting the rotational speed of an input shaft of the transmission 4, 10 a vehicle speed sensor for detecting the speed of the vehicle, 11 a gear position sensor for detecting a gear position of the transmission 4, and 12 an accelerator sensor for detecting the amount or depth to which the accelerator pedal 8 is depressed. Output signals from these sensors are supplied to the electronic control system 1. The clutch 3 and the transmission 4 are associated with a clutch actuator 13 and a transmission actuator 14, respectively, for mechanically operating the clutch 3 and the transmission 4. The clutch and transmission actuators 13, 14 are controlled by the electronic control system 1 based on the output signals from the sensors 9 through 12 and an output signal from the selector lever 7. A battery 15 serves as a power supply for various electric components on the vehicle and the electronic control system 1.

Figure 9:
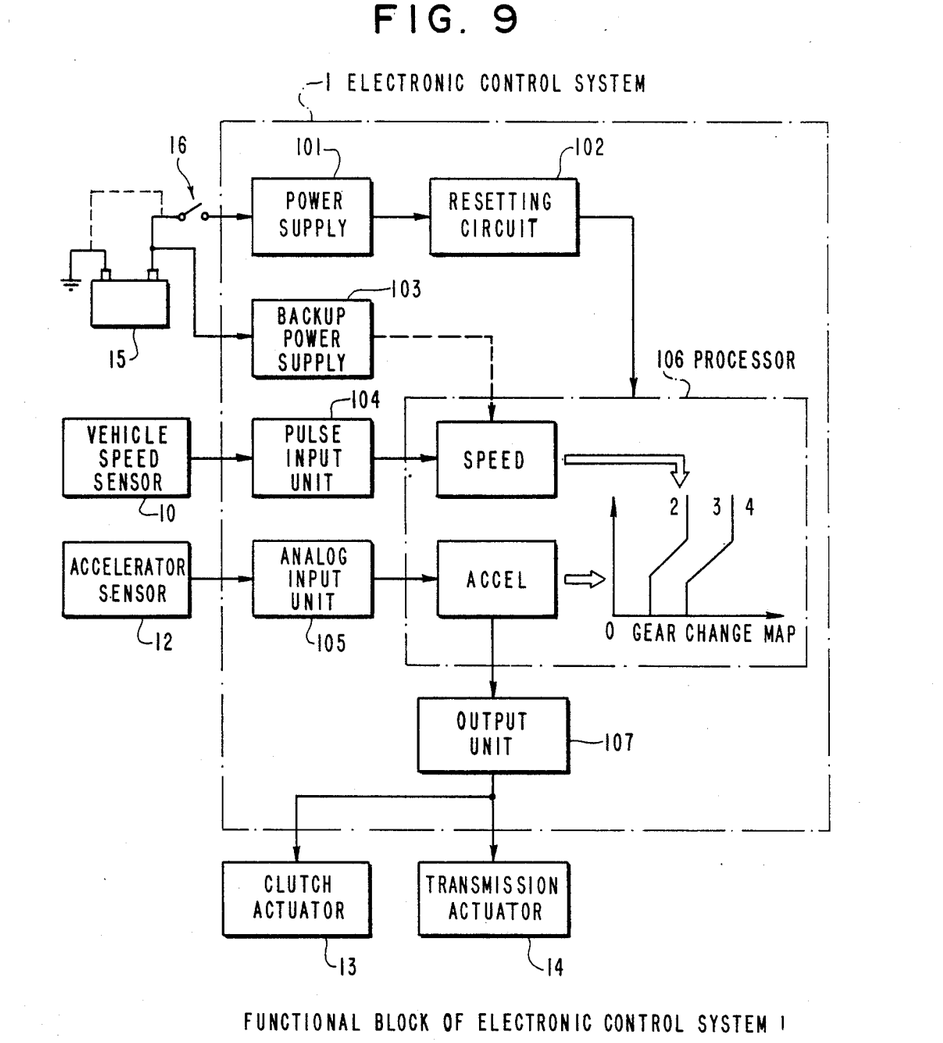
FIG. 9 is a functional block diagram explaining primary operation of the conventional electronic control system.

FIG. 9 shows a block diagram of the electronic control system 1 for explaining main operation thereof. The electronic control system 1 includes a pulse input unit 104 for counting pulses from the vehicle speed sensor 10 and an analog input unit 105 for converting an analog output from the accelerator sensor 12 to a digital signal through A/D conversion. In a processor 106, a count from the pulse input unit 104 is put in a variable "SPEED", and a digital signal from the analog input unit 105 is put in a variable "ACCEL". The processor 106 searches a predetermined gear change map for an optimum gear position based on "SPEED" and "ACCEL". The gear change map is stored in a ROM (not shown) and has a horizontal axis representing the variable "SPEED" and a vertical axis representing the variable "ACCEL". The processor 106 determines the optimum gear position at the intersection of the variables "SPEED" and "ACCEL". The processor 106 then issues the optimum gear position to an output unit 107 which operates the clutch actuator 13 and the transmission actuator 14 for a speed changing operation. After the processor 106 determines the optimum gear position, it operates the clutch actuator 13 to disengage the clutch 3 and then operates the transmission actuator 14 to switch the transmission 4 out of the present gear position into the neutral position and then into the optimum gear position. Thereafter, the processor 106 operates the clutch actuator 13 again to engage the clutch 3, thus completing the gear changing operation.

In FIG. 9, the voltage of the battery 15 is applied via a keyswitch 16 to a power supply 101 and also applied to a backup power supply 103. Even when the keyswitch 16 is open, electric power is supplied from the backup power supply 103 to a data storage RAM (not shown) in the processor 106. A resetting circuit 102 serves to enable the processor 106 to effect an initializing process dependent on a change in the output voltage from the power supply 101.

Figure 10:
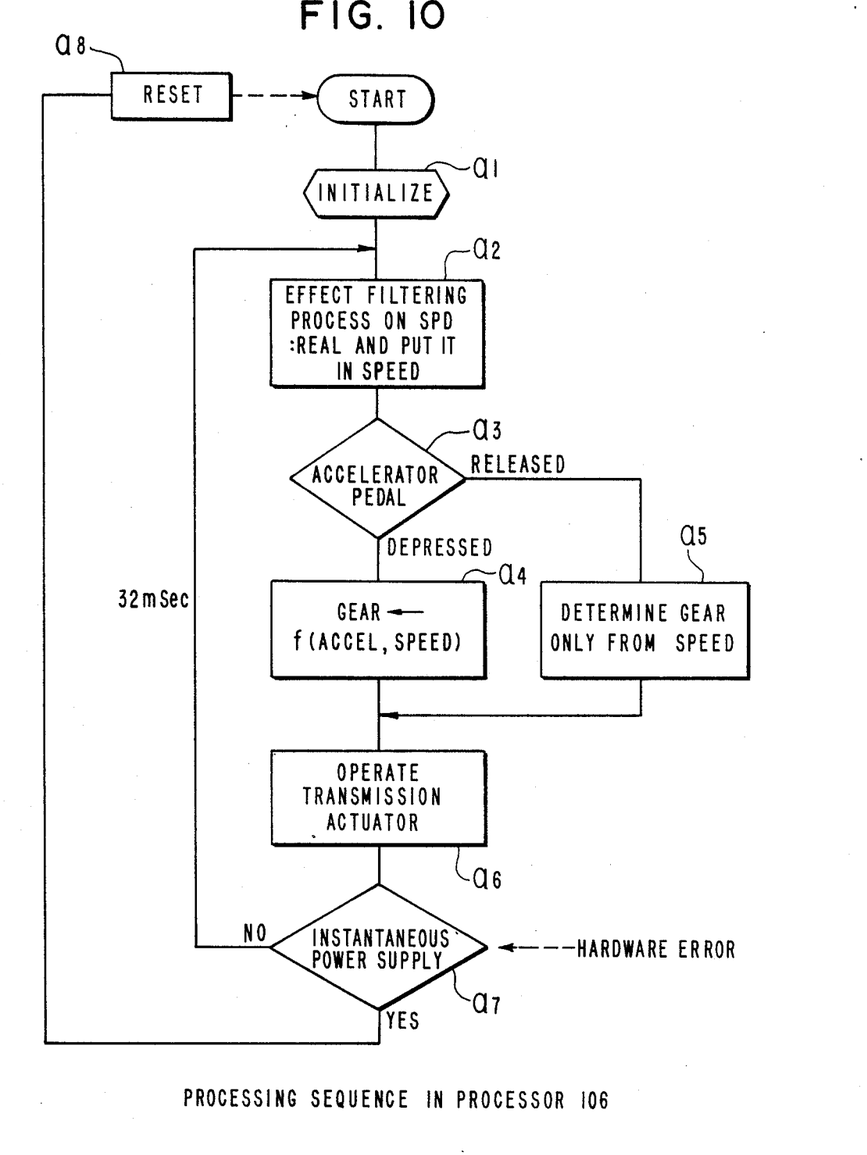
FIG. 10 is a flowchart of a sequence effected by a processor shown in FIG. 9.

A processing sequence of the processor 106 will be described with reference to FIG. 10.

An initializing process is effected in a step $a_1$. In the initializing process, variables such as "SPEED", "SPD:REAL", "ACCEL", and the like, described below are cleared. Then, control goes to a step $a_2$ in which a count from the pulse input unit 104 is put in the variable "SPD:REAL". A filtering process (digital filter) is effected on the variable "SPD:REAL", which is then put in "SPEED". The filtering process serves to reduce the effect of an error of the vehicle speed data. More specifically, the vehicle speed sensor 10 generates a pulse signal in synchronism with the rotation of the output shaft of the transmission 4. The electronic control system 1 detects the vehicle speed based on the pulse signal from the vehicle speed sensor 10. Generally, the vehicle speed may be detected by either a pulse counting method wherein the vehicle speed is calculated according to the detected period of the pulse signal or a time window method wherein the vehicle speed is calculated according to a count of the pulse signal within a given period of time. The vehicle speed which is determined by these methods tends to fluctuate due to chattering or noise. The adverse effect which the chattering or noise has on the vehicle speed can be removed by the filtering process. Although there are several filtering process types, the period of the pulse signal is determined by averaging the periods of preceding N pulses (N=4) are involved, the average period T is calculated as follows:

$$T = [T(i-3) + T(i-2) + T(i-1) + T(i)] \div 4$$

where $T(i-3)$, $T(i-2)$, $T(i-1)$, $T(i)$ are the periods of the fourth, third, second, and first preceding pulses, respectively, before the time when the periods are averaged.

Thereafter, control proceeds to a step $a_3$ which refers to the amount of depression "ACCEL" of the accelerator pedal from the analog input unit 105 (FIG. 9) to see if the accelerator pedal has been depressed or not. If depressed, then control goes to a step $a_4$. In the step $a_4$, the gear change map is searched for an optimum gear position based on values of "ACCEL" and "SPEED", and the optimum gear position is put in a variable "GEAR". If the accelerator pedal is released, control goes to a step $a_6$ in which a gear position is determined only from the vehicle speed "SPEED" irrespective of the amount of depression of the accelerator pedal "ACCEL". In this case, no speed change is effected even if the vehicle speed rises since a gear upshift has to be prohibited.

When the optimum gear position "GEAR" is determined, the value of "GEAR" is given to the output unit 107 (FIG. 9) to operate the clutch actuator 13 and the transmission actuator 14. Finally, a step $a_7$ determines whether an instantaneous power supply cutoff is caused by a hardware error. If not, then control goes back to the step $a_2$ to repeat the processing from the step $a_2$ to the step $a_7$ at a period of 32 msec. If an instantaneous power supply cutoff is developed, then the processor 106 is reset by the resetting circuit 102 in a step a8 to resume the entire sequence from the initializing step a1.

Figure 11A:
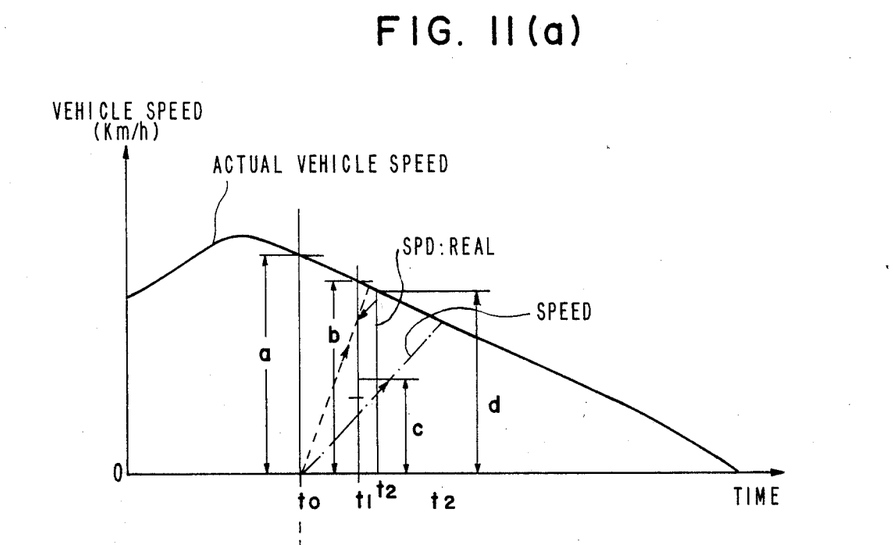
FIGS. 11(a) and 11(b) are diagrams showing by way of example a running pattern of the vehicle incorporating the conventional electronic control system at the time of an instantaneous power supply cutoff.
Figure 11B:
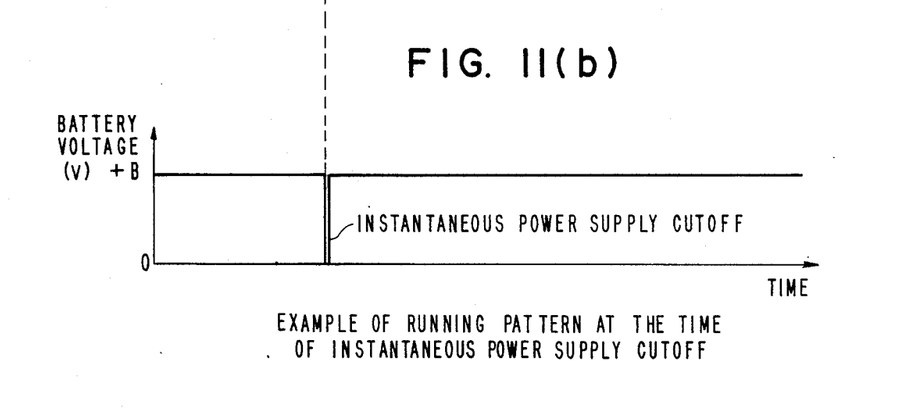

FIG. 11(a) shows by way of example a running pattern (relationship between vehicle speeds and time) dependent on a change in the battery voltage (FIG. 11(b)) in the automobile incorporating the conventional electronic control system 1. In the illustrated example, electric power supplied to the electronic control system 1 is instantaneously cut off at a time $t_0$ by a breakage or short circuit of a vehicle harness, a temporary opening of the keyswitch (FIG. 9), or the like. When this happens, the processor 106 is reset by the steps a7 and a8 in FIG. 10 and carries out the initializing process (step a1). Since "SPD:REAL" and "SPEED" are cleared by the initializing process, an internal value of the processor 106 becomes 0 [km/h] regardless of the fact that the actual speed is a [km/h] as shown in FIG. 11(a).

Subsequently, an optimum gear position is determined in approximately 32 msec. If the accelerator pedal is depressed at this time, the optimum gear position "GEAR" is updated in the step a4 by the speed change as the vehicle speed increases (i.e., as the value "SPEED" increases). If the accelerator pedal is released, the optimum gear position is determined solely from "SPEED" in the step a5, and no gear upshift is performed even if the value "SPEED" increases afterwards. In the latter case, as shown in FIG. 11(a), after the time $t_0$, "SPEED" (indicated by the dot-and-dash line) approaches the actual vehicle speed (indicated by the solid line) at a smaller gradient (because of the filtering process) than "SPD:REAL" (indicated by the broken line). When a gear position is determined at a time $t_1$, for example, or if the vehicle speed possible in the second gear position is c [km/h], then the optimum gear position is determined as the second gear position based on "SPEED" at the time $t_1$. When the gears are actually shifted into the optimum gear position at a later time $t_2$, the optimum gear position remains as the second gear position determined at the time $t_1$ even if the actual speed is d [km/h] which is far higher than c [km/h]. Therefore, when the gears are actually shifted into the second gear position, the engine overruns causing the vehicle to operate erratically.

SUMMARY OF THE INVENTION

It is an object of the present invention to provide an electronic control system for controlling an automatic transmission to allow the vehicle to run safely without erroneous gear shifting even when a power supply on the vehicle is instantaneously cut off to set the system while the vehicle is running.

According to the present invention, there is provided an electronic control system for controlling an automatic transmission mounted on a vehicle based on at least vehicle speed data of the vehicle, comprising: resetting unit for issuing a reset signal when a power supply for supplying electric power to the electronic control system is cut off; timer unit for counting a predetermined period of time after the electronic control system is reset by the reset signal; memory unit for storing vehicle speed data immediately before the power supply is cut off; and gear position determining unit for determining a gear position for the automatic transmission based on at least the vehicle speed data stored in the memory unit and in accordance with the predetermined period counted by the timer unit.

With the aforesaid arrangement, when the power supply is instantaneously cut off while the vehicle is running and the electronic control system is reset, the vehicle speed data immediately prior to the power supply cutoff is stored in the memory unit, and the timer unit starts operating after the electronic control system is reset. Until operation of the electronic control system becomes stable at the predetermined of the timer unit the gear position determining unit determines a gear position based on the vehicle speed data immediately prior to the power supply cutoff. Therefore, since the actual vehicle speed during the predetermined period after the power supply cutoff is substantially the same as the actual vehicle speed immediately prior to the power supply cutoff, the gear position thus determined is suitable for the running conditions of the vehicle at the time. Consequently, the vehicle is allowed to run safely without erroneous gear shifting even after the power supply cutoff.

The above and other objects, features and advantages of the present invention will become more apparent from the following description when taken in conjunction with the accompanying drawings in which a preferred embodiment of the present invention is shown by way of illustrative example.

DESCRIPTION OF THE PREFERRED EMBODIMENT

Figure 1:
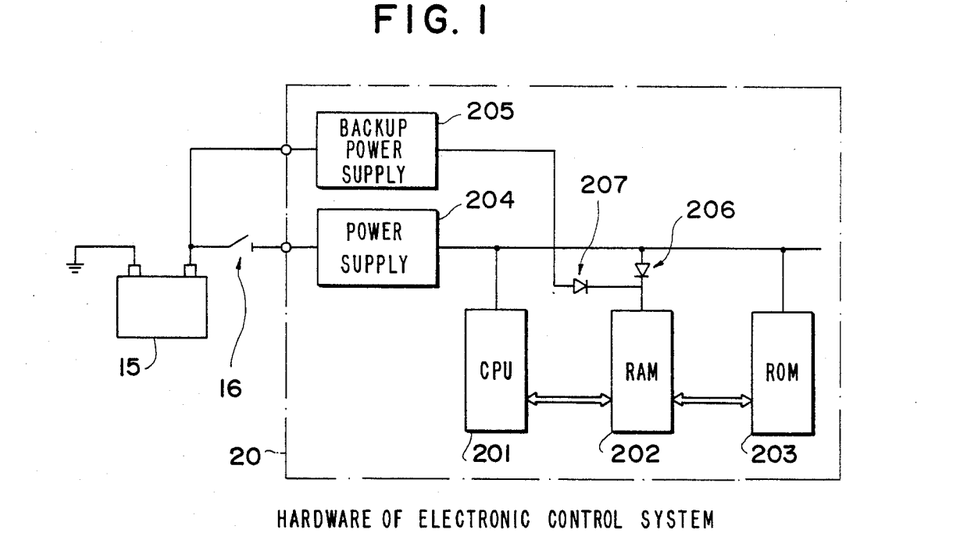
FIG. 1 is a block diagram of an electronic control system according to an embodiment of the present invention.

FIG. 1 shows an electronic control system 20 that can be incorporated in a vehicle such as an automobile for controlling an automatic transmission.

The electronic control system 20 includes a CPU 201, a RAM 202, and a ROM 203 as a calculation processor effecting various processing sequences for controlling the transmission. A resetting unit (not shown), which is similar to the resetting circuit 102 shown in FIG. 9, is connected between a power supply 204 and the CPU 201. Electric power from a battery 15 mounted on a vehicle is supplied through a keyswitch 16 and a power supply 204 to the CPU 201, the RAM 202, and the ROM 203. The RAM 202, which is a backup RAM, is also supplied with electric power from a backup power supply 205. Diodes 206, 207 are connected to the RAM 202 for preventing a reverse current from flowing through the RAM 202. The processing operation of the electronic control system 20 is stopped by opening the contacts of the keyswitch 16. However, since the battery voltage is applied to the RAM 202 from the backup power supply 205 at all times, the data stored in the RAM 202 are protected when the contacts of the keyswitch 16 are opened.

Figure 2:
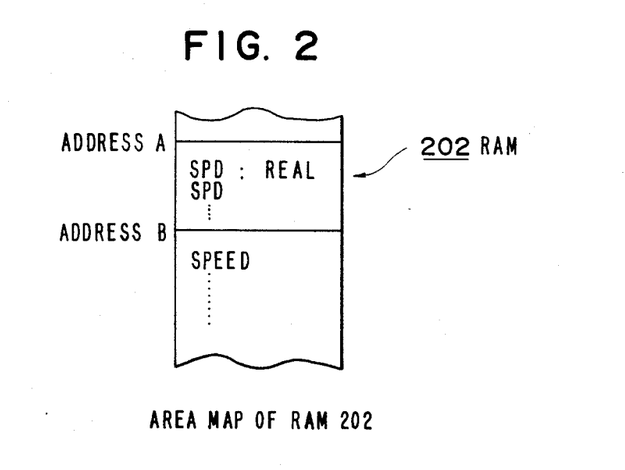
FIG. 2 is a diagram showing an area map of variables stored in a RAM in the electronic control system of FIG. 1.

FIG. 2 shows an area map indicating the location of variables in the RAM 202. An area between addresses A and B, which can be cleared by an initializing process, stores variables "SPD:REAL" and "SPD" described later on. The area between the addresses A and B also stores a count from the counter unit. Areas from the address B cannot be cleared unless an abnormality of the backup power supply 205 is confirmed. These areas store the variable "SPEED", a failure diagnosis value, a learned clutch value, and the like. Therefore, even if the electronic control system 20 is de-energized, the data in the RAM 202 in the areas from the address B remain stored and are not cleared.

Figure 6:
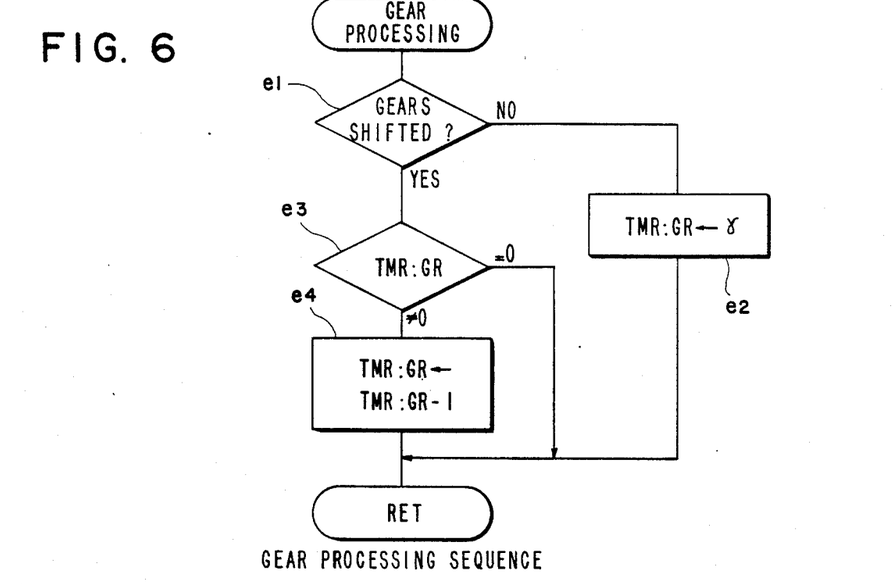
FIG. 6 is a detailed flowchart of a gear processing sequence (step b3) in the processing sequence of FIG. 3.
Figure 7:
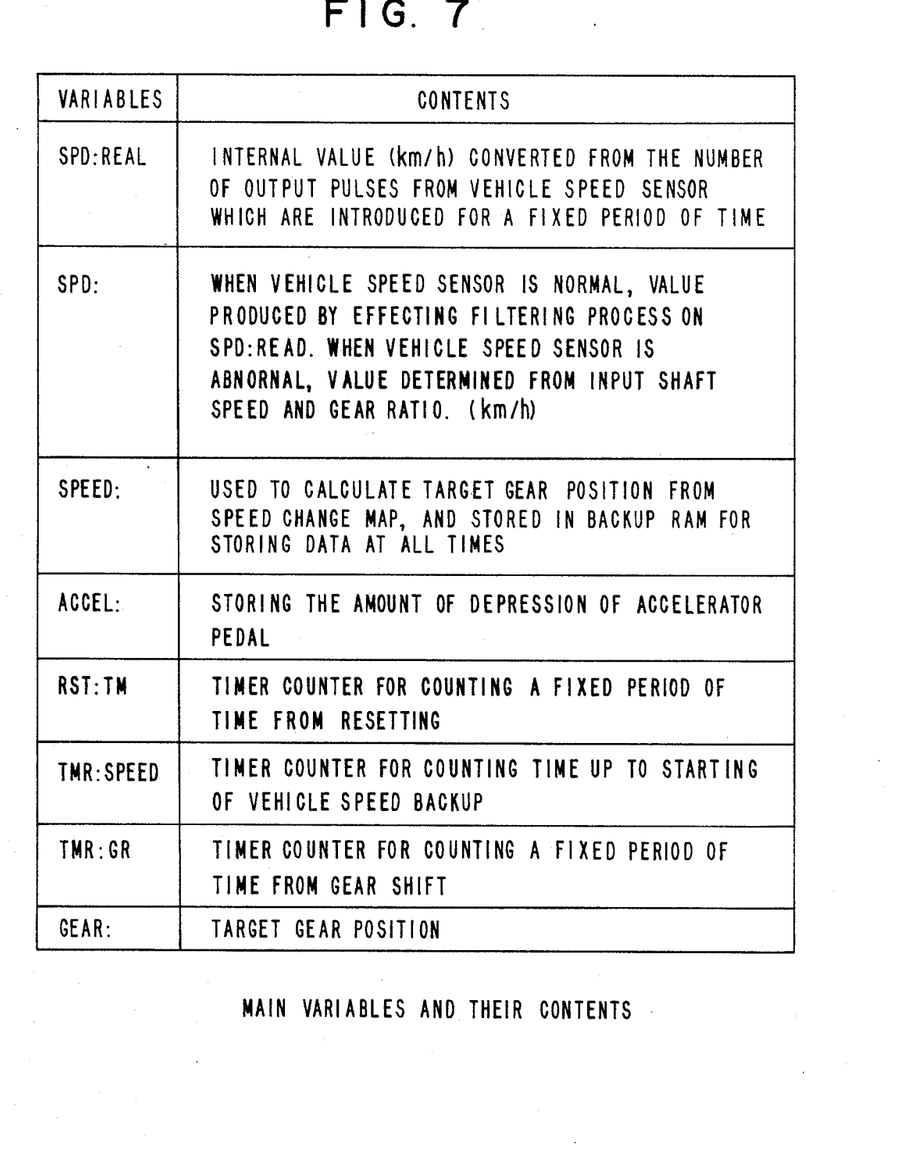
FIG. 7 is a diagram illustrating main variables and their contents which are employed in the processing sequences.

Processing operation of the electronic control system which is incorporated in a commercial vehicle will be described with reference to FIGS. 3 through 6. Main variables used in the processing operation are shown in FIG. 7.

Figure 3:
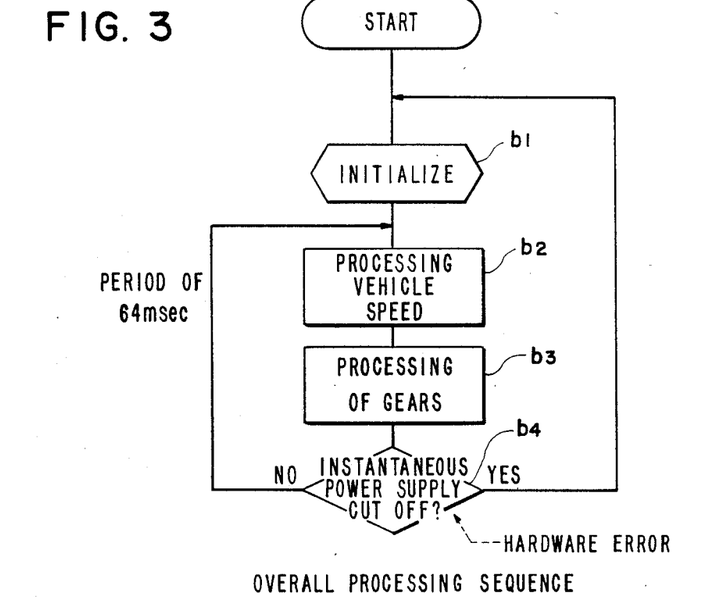
FIG. 3 is a flowchart of an overall processing sequence of the electronic control system of FIG. 2.

A flowchart of an overall processing sequence is illustrated in FIG. 3. After the electronic control system is energized, an initializing processing sequence is effected in a step $b_1$, and then a vehicle speed processing sequence (step $b_2$) and a gear processing sequence (step $b_3$) are carried out. A next step $b_4$ determines whether the power supply is instantaneously cut off or not. If not, then control goes back to the step $b_2$. If the power supply is instantaneously cut off, then control returns to the step $b_1$. Therefore, as long as the power supply is alive, the vehicle speed processing sequence (step $b_2$) and the gear processing sequence (step $b_3$) are repeated during a period of 64 msec. If the power supply is instantaneously cut off while the CPU is in operation, the power supply is switched on again, and then the processing is started again from the initializing sequence (step $b_1$).

The initializing sequence (step $b_1$) will be described in greater detail with reference to FIG. 4.

Figure 4:
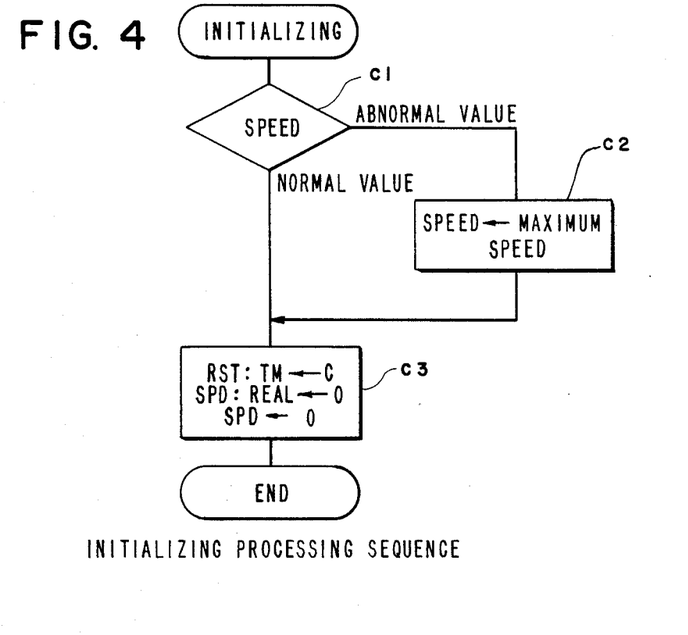
FIG. 4 is a detailed flowchart of an initializing processing sequence (step b1) in the processing sequence shown in FIG. 3.

Step $c_1$ in FIG. 4 first determines whether the value of the variable "SPEED" is static (see FIG. 2), the variable "SPEED" which indicates the vehicle speed immediately prior to the power supply cutoff is normal or abnormal. The step $c_1$ is effected because though the variable "SPEED" is static (see FIG. 2), the variable "SPEED" may have been cleared due to a hardware failure, a failure of the backup power supply 205, or noise. If the value of the cleared variable "SPEED" were read in, the vehicle speed would be determined as being zero, and the gear position determining means which determines the gear position of the transmission would select a lowest gear position, causing the engine to overrun. Therefore, even if the value of the variable "SPEED" has been cleared due to one of the above-mentioned failures, the gear position determining unit determines a higher gear position, and hence the engine is prevented from overrunning. If the value of "SPEED" is normal in the step $c_1$, then this value is retained and control proceeds to step $c_3$. When the value of "SPEED" is abnormal, control goes to step $c_2$ where a maximum vehicle speed value (e.g. 100 km/h) is substituted for "SPEED". Control then proceeds to a step $c_3$. In the step $c_3$, a preset value C is put in the variable "RST:TM", and "0" is put in the variables "SPD:REAL" and "SPD" (see FIG. 2). The preset value C is selected to be a predetermined time required for processing after resetting to stabilize. This is because a certain period of time is required for the filtering process until the vehicle speed is detected after the system is reset. Even if no filtering process is effected, a period of time is required to detect the period of the pulse signal or count the pulse signal. In this initializing process, "SPD:REAL" and "SPD" are cleared, but "SPEED" is not cleared. "RST:TM" serves a timer for counting the predetermined fixed period of time from resetting, by being decremented in a step $d_{15}$ (described later). Such a timer is needed because a certain period of time is required until the vehicle speed is detected after the system is reset, as described above.

Figure 5A:
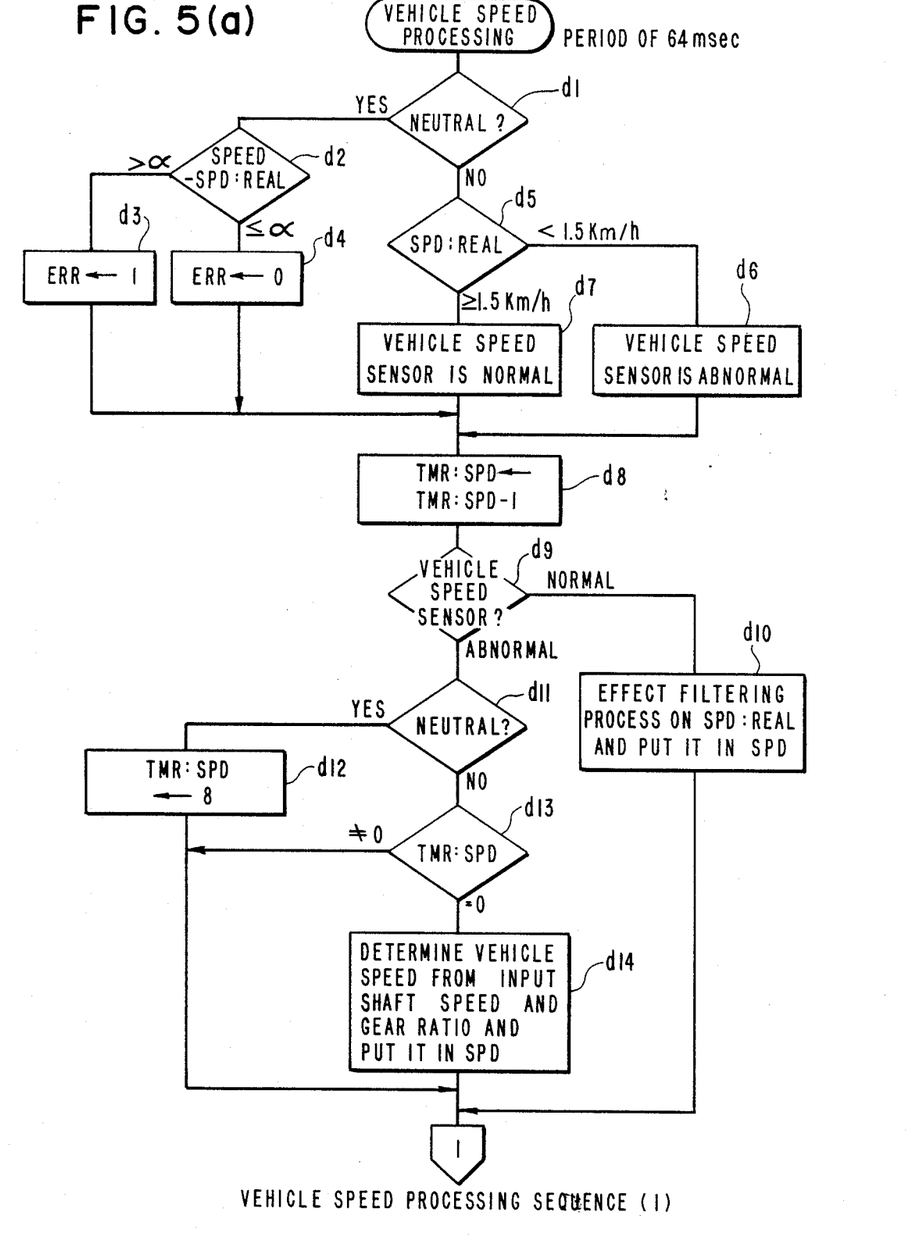
FIGS. 5(a) and 5(b) are flowcharts showing a vehicle speed processing sequence (step b3) in the processing sequence shown in FIG. 3.
Figure 5B:
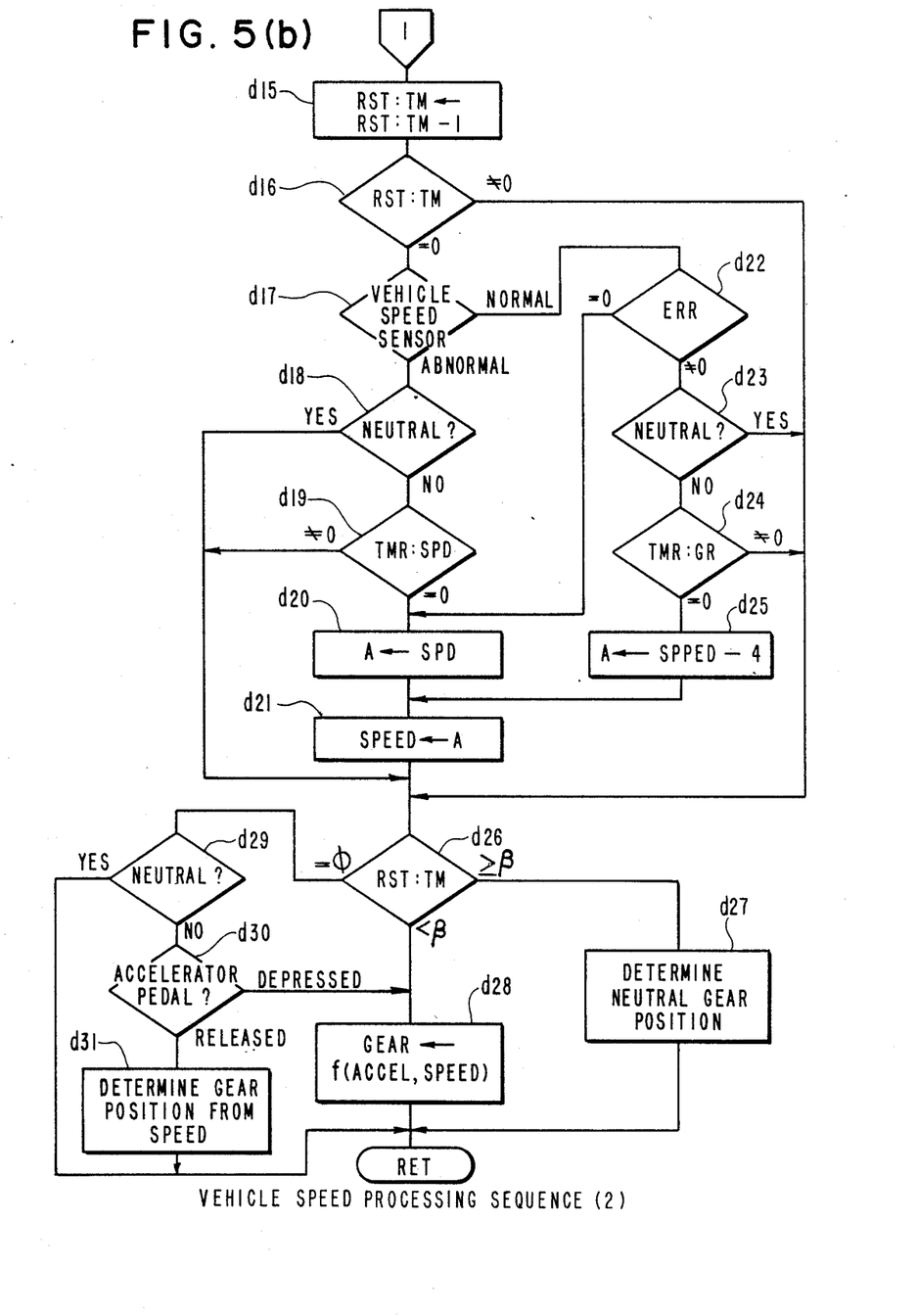

The vehicle speed processing sequence (step $b_2$) is shown in greater detail in FIGS. 5(a) and 5(b). This processing sequence is effected in the period of 64 msec., as described previously. The vehicle speed processing sequence is performed for a fail-safe control mode in the event of a vehicle speed sensor failure as well as for a control mode in the event of a power supply cutoff.

In FIG. 5(a), a process from a step $d_1$ through a step $d_7$ serves to detect any abnormality of the vehicle speed sensor 10 (FIG. 8). First, a step $d_1$ determines whether the gears are in a neutral position or not. If in the neutral position, then control goes to a step $d_2$. The step $d_2$ determines whether the difference between "SPEED" (vehicle speed after being subjected to a filtering process) produced in the period of 64 msec. and "SPD:REAL" (the vehicle speed prior to being subjected to the filtering process) exceeds a preset value $\alpha$ or not. If the difference exceeds the preset value $\alpha$, then "ERR" is set to "1" in a step $d_3$. If the difference is equal to or smaller than the preset value $\alpha$, then "ERR" is set to "0" in a step $d_4$. The preset value $\alpha$ is a value (e.g., 16 km/h) at which the number of output pulses from the vehicle speed sensor is regarded as abruptly varying in the period of 64 msec. More specifically, if the difference "SPEED"—"SPD:REAL" is found greater than the value $\alpha$ (16 km/h) in the period of 64 msec. in the step $d_2$, then it is determined that the vehicle speed has varied to an extent which would not usually be experienced in the normal running pattern and that the vehicle speed sensor fails to operate normally, and "ERR" is set to "1". The processing from the step $d_2$ through the step $d_4$ can determine any abnormality of the vehicle speed sensor when the gears are in the neutral position (including a neutral condition immediately after resetting in a step $d_{27}$, described later). Stated otherwise, while the gears are in the neutral position, the vehicle speed sensor is regarded as being normal when "ERR" is "0", and regarded as being abnormal when "ERR" is "1".

If not in the neutral position in the step $d_1$, control proceeds to a step $d_6$, which determines whether "SPD:REAL" is smaller than a preset value (1.5 km/h in the illustrated embodiment). If smaller than 1.5 km/h, then the vehicle speed sensor is regarded as being abnormal (step $d_6$, and if equal to or higher than 1.5 km/h, then the vehicle speed sensor is regarded as being normal (step $d_7$). Even if the transmission is in the lowest gear position, it is impossible for the motor vehicle to run at a speed below 1.5 km/h. Therefore, if the vehicle speed lower than 1.5 km/h is detected when the transmission is not in the neutral position, then the vehicle speed sensor is regarded as being abnormal. With the steps $d_5$ through $d_7$, it is possible to determine any anormality of the vehicle speed sensor when the gears are in gear positions other than the neutral position. Any abnormality of the vehicle speed sensor is determined by the different methods, as described above, depending on whether the gear position is neutral or not. These different methods are selectively employed for the following reasons: When the gear position is neutral, the drive power from the engine is not transmitted to the road wheels, and it is impossible for the motor vehicle to run even at a speed lower than 1.5 km/h. Therefore, it is difficult to determined whether the vehicle speed sensor is normal or abnormal according to the vehicle speed. When the gear position is not neutral, the vehicle speed varies greatly at the time the motor vehicle is braked, the present value $\alpha$ cannot be established. Therefore, it is difficult to determine whether the vehicle speed sensor is normal or abnormal according to a change in the vehicle speed.

Processing from the step $d_1$ through the step $d_7$ can therefore reliably determine if the vehicle speed sensor is abnormal no matter which gear position the gears may be in while the vehicle is running.

The processing from a step $d_8$ through a step $d_{25}$ will be described below. This processing operation serves to determine the value of "SPEED" used for determining an optimum gear position in steps $d_{28}$, $d_{31}$, described later on.

A step $d_8$ decrements a variable "TMR:SPD". Therefore, by decrementing "TMR:SPD" in the period of 64 msec. in the step $d_8$, this variable operates as a timer for counting a period of time after the gears are released from the neutral position to the starting of an increase in vehicle speed. The variable "TMR:SPD" is employed in order to determine abnormality of the vehicle speed sensor after such vehicle speed sensor abnormality has been detected for a certain period of time.

Then, control goes to a step $d_9$ which confirms whether the vehicle speed sensor is detected as being abnormal or not in the steps $d_6$ through $d_7$. If the vehicle speed sensor is normal, control jumps to a step $d_{10}$ in which the variable "SPD:REAL" is subjected to a filtering process and then put in "SPD". If the vehicle speed sensor is abnormal, then a step $d_{11}$ determines if the gear position is neutral or not. If neutral, then control proceeds to a step $d_{12}$ in which a preset value (8 in the illustrated embodiment) is put in "TMR:SPD". If not neutral, a step $d_{13}$ determines whether "TMR:SPD" becomes "0" (i.e., $8 \times 64$ msec. has elapsed after the gears are released from the neutral position). Control then goes to a step $d_{14}$ only when "TMR:SPD"=0. Since "SPD:REAL" cannot be used when the vehicle speed sensor is abnormal, a vehicle speed is determined from the input shaft rotational speed and the gear ratio and put in "SPD" in the step $d_{14}$. Step $d_{11}$ determines whether the gear position is neutral or not, as described above, because when the gear position is neutral, the vehicle speed cannot be determined in the step $d_{14}$ as the rotation of the input shaft is not transmitted to the road wheels. The step $d_{13}$ determines whether "TMR:SPD" is "0" or not because abnormality of the vehicle speed sensor is finally determined after such vehicle speed sensor abnormality has been detected for a certain period of time, and then the backup process is effected in the step $d_{14}$.

According to the processing from the step $d_8$ through the step $d_{14}$, vehicle speed data determined dependent on whether the vehicle speed sensor is normal or abnormal are put in "SPD" except during a period in which the gear position is neutral and for a fixed period ($8 \times 64$ msec.) after the gears are released from the neutral position.

Then, control goes to a step $d_{15}$ in FIG. 5(b) which decrements "RST:TM" in which the preset value C has been put by the initializing sequence (step $c_3$). Then, a step $d_{16}$ confirms whether "RST:TM" has become "0" (i.e., $C \times 64$ msec. has elapsed after resetting) or not. Only when "RST:TM"=0, control goes to a step $d_{17}$ which confirms whether the vehicle speed sensor is normal or not. The variable "RST:TM" is employed in order to wait until the vehicle speed can be detected accurately. During the timer counting operation, the vehicle speed immediately prior to a power supply cutoff or the maximum vehicle speed is stored in "SPEED" (see the steps $c_1$, $c_2$). More specifically, if "RST:TM" is not "0", then steps $d_{17}$ through $d_{25}$ (described later on) are skipped, and the value of the variable "SPEED" is maintained. A gear position is thus determined based on the vehicle speed immediately prior to a power supply cutoff or the maximum vehicle speed in steps $d_{28}$, $d_{31}$. After the value of C is substituted for "RST:TM" in step $c_3$ and "RST:TM" becomes "0", it produces "0" even if it is later decremented. If the vehicle speed sensor is abnormal in step $d_{12}$, the gear position is other than neutral in step $d_{18}$ and "TMR:SPD"=0 in step $d_{19}$ (i.e., $8 \times 64$ msec. has elapsed from a release from the neutral position), control then proceeds to steps $d_{20}$ and $d_{21}$. In the steps $d_{20}$, $d_{21}$, "SPD" obtained in the step $d_{14}$ is put in "SPEED via variable A".

If the vehicle speed sensor is normal in the step $d_{17}$, a step $d_{22}$ confirms whether "ERR" obtained in the steps $d_3$, $d_4$ is "0" (i.e., the vehicle speed sensor during the neutral gear position is abnormal) or not. If "ERR"=0, then "SPD" obtained in the step $d_{10}$ is put in "SPEED via variable A in steps $d_{20}$, $d_{21}$". If "ERR"$\neq$0 in the step $d_{22}$, the gear position is other than neutral in step $d_{23}$ and "TMR:GR"=0 in step $d_{24}$ (i.e., upon elapse of a certain period of time after actual gear shifting as shown in FIG. 6), control proceeds to steps $d_{25}$ and $d_{21}$. In the step $d_{25}$, a preset value (4 [km/h] in this embodiment) is subtracted from "SPEED" (which is keeping the vehicle speed held in the initializing sequence), and the difference is put in "SPEED via variable A" in the step $d_{21}$. Thus, when "TMR:GR"=0, the value of "SPEED" is decremented by 4 [km/h] for every 64 msec.

Therefore, according to the processing from the step $d_{16}$ through $d_{25}$, the vehicle speed held in the initializing sequence (i.e., the vehicle speed obtained immediately before the instantaneous power supply cutoff or the maximum vehicle speed obtained in the step $c_3$) is put in "SPEED" when "RST:TM"$\neq$0 (i.e., until $C \times 64$ msec. has elapsed from resetting), irrespective of whether the vehicle speed sensor is normal or abnormal. When "RST:TM"=0, vehicle speed dependent on whether the vehicle speed sensor is normal or abnormal is put in "SPEED". Particularly, when an abnormality of the vehicle speed sensor is confirmed (including when "ERR"≠0), the preceding value of "SPEED" is retained without being updated insofar as the gear position is neutral or before a prescribed period of time elapses after the gears are shifted into another position.

The processing from a step $d_{25}$ through a step $d_{31}$ will hereinafter be described. This processing operation serves to determine a gear position according to "RST:TM".

First, a step $d_{26}$ confirms the value of "RST:TM". If the value of "RST:TM" is equal to or greater than $\beta$ (<C), i.e., if within a prescribed period of time immediately after resetting, the gear position is forcibly determined to be neutral in a step $d_{27}$. This is because immediately after resetting, the CPU 201 does not recognize any of operating conditions of the motor vehicle (such as the engine speed, the vehicle speed, the gear position), and therefore it is safer to hold the transmission temporarily in the neutral position. If "RST:TM" is between $\beta$ and 0, then control goes to a step $d_{26}$. Therein an optimum gear position variable "GEAR" is determined from the speed change map based on "ACCEL" representing the amount of depression of the accelerator pedal and also from "SPEED" (the vehicle speed held in the initializing sequence since "RST:TM"≠0 at this time) obtained in the steps $d^6$ through $d^{25}$. If "RST:TM"=0, control goes to a step $d_{29}$ to confirm whether the gear position is neutral or not. If neutral, then the gear position is not changed but held. If not neutral, then a step $d_{30}$ confirms whether the accelerator pedal is depressed or not. If the accelerator pedal is depressed, then control goes to the step $d_{29}$ in which an optimum gear position is determined from the speed change map based on "ACCEL" and "SPEED" (the vehicle speed determined dependent on whether the vehicle speed sensor is normal or abnormal since "RST:TM"=0 at this time). If the accelerator pedal is released, then the gear position is determined solely based on "SPEED" at this time in a step $d_{31}$.

With the steps $d_{26}$ through $d_{31}$, therefore, a safe gear position is determined for a prescribed period of time after resetting (until "RST:TM" becomes "0") irrespective of the vehicle speed "SPD" obtained at this time. Upon elapse of the prescribed period of time after resetting (i.e., when "RST:TM"=0), a safe gear position based on the vehicle speed dependent on whether the vehicle speed is determined sensor is normal or abnormal.

The gear processing sequence (step $b_3$ in FIG. 3) is shown in greater detail in FIG. 6.

A step $e_1$ first confirms whether the gears are actually shifted into the gear position determined by the aforesaid vehicle speed processing sequence. If not, then a preset value r (e.g., 16) is put in the variable "TMR:GR" in a step $e_2$. If the gears are in the determined gear position in the step $e_1$, "TMR:GR" is decremented until it becomes 0 in steps $e_3$, $e_4$. Thus, "TMR:GR" serves as a timer for counting a fixed period of time (r×64 msec.) after the gears are shifted. The value of "SPEED" varies dependent on whether "TMR:GR"=0 or not as indicated in the step $d_{24}$ of FIG. 5(b).

An example of vehicle operation for an automobile which incorporates the electronic control system 20 will be described with reference to FIG. 11. It is assumed in FIG. 11 that power supply is subjected to an instantaneous cutoff at a time t while the vehicle is running. Values of "SPEED", "SPD", and "SPD:REAL" at $t_0$ are all a [km/h], and the gear position is a sixth gear position.

A situation in which the power supply undergoes an instantaneous cutoff and the vehicle speed sensor fails at $t_0$ will be described below.

The initializing sequence (step $b_1$) is effected, "SPD" and "SPD:REAL" are cleared to 0, and the reset value C is put in "RST:TM" (step $c_3$). Since "SPEED" contains the vehicle speed a [km/h] immediately before the instantaneous power supply cutoff, the difference ("SPEED"-"SPD:REAL") becomes a which exceeds the preset value $\alpha$, and hence "ERR" becomes "1" (steps $d_2$, $d_3$). Immediately after resetting (when "RST:TM"≧$\beta$), the gear position becomes neutral (step $d_{27}$). Therefore, it cannot be determined that the vehicle speed sensor is abnormal, and the value read from the vehicle speed sensor is put in "SPD:REAL" and "SPD", which are 0 [km/h].

When "RST:TM" becomes smaller than $\beta$, the target gear position is determined according to "ACCEL" and "SPEED" (step $d_{28}$). At this time, since "SPEED" is the vehicle speed a [km/h] immediately prior to the instantaneous power supply cutoff, the speed change map is searched based on this speed value, with the result that the gear position is determined to be the sixth gear position which is the same as the gear position immediately before the instantaneous power supply cutoff. After the gears have been shifted from the neutral position to the sixth gear position, a vehicle speed sensor abnormality is detected when "SPD:REAL'-'<1.5 km/h (steps $d_5$, $d_6$). Upon elapse of a certain period of time from the above gear shifting ("TMR:SPD"=0), the vehicle speed is calculated according to the input shaft rotational speed and the gear ratio irrespective of "SPD:REAL" (steps $d_{13}$, $d_{14}$). If "RST:TM"=0, then the vehicle speed is put in "SPEED" (steps $d_{19}$, $d_{20}$, $d_{21}$). Therefore, from a next loop on, an optimum gear position is determined according to "SPEED" and "ACCEL" (steps $d_{28}$ through $d_{31}$).

If the power supply is cut off while the vehicle speed sensor is normal at the time $t_0$, the same processing as described above is performed during a period of time in which "RST:TM"≠0. When "RST:TM"=0, the actual speed is put in "SPD:REAL" and "SPD" since the vehicle speed sensor is normal (step $d_{10}$), and is put in "SPEED" to determine a gear position.

With the present embodiment, as described above, the value "speed" is not cleared during a period of time (when "RST:TM"≠0) after resetting caused by an instantaneous power supply cutoff until operation becomes stable. Instead, vehicle speed immediately prior to the instantaneous power supply cutoff (or the maximum vehicle speed) is retained in "SPEED". Thereby a gear position suitable enough for the running conditions of the vehicle at the time, is determined irrespective of the accelerator pedal being depressed or not and the vehicle speed sensor being normal or abnormal. As a benefit, the vehicle is allowed to run safely without erroneous gear shifting even after an instantaneous power supply cutoff. After "RST:TM"=0, an abnormality of the vehicle sensor can be detected in any gear position including the neutral position. Therefore, the safety of the vehicle is enhanced while it is running.

The settings of the various times ("RST:TM", "TMR:SPD", "TMR:GR") are not limited to the values described above, but may be of values optimum for the performance, use, and the like of the particular in which the electronic control system is to be incorporated.

As described above, the electronic control system of the present invention for controlling an automatic transmission holds vehicle speed data immediately prior to an instantaneous power supply cutoff even when the control system is reset while the vehicle is running. An optimum gear position based on the held vehicle speed data is thereby determined immediately after the control system is reset. Therefore, the vehicle can run safely without erroneous gear shifting and also without the danger of damage or breakage of the transmission clutch, engine, and other components.

Although a certain preferred embodiment has been shown and described, it should be understood that many changes and modifications may be made therein without departing from the scope of the appended claims.

What I claim is:

1. An electronic control system, connected to a power supply having an output voltage, for controlling an automatic transmission mounted on a vehicle based on vehicle speed data of the vehicle indicated by a vehicle speed sensor and an accelerator position signal from an accelerator depression sensor, said electronic control system comprising:

gear position determining means for determining a gear position of the automatic transmission based on the vehicle speed data and the accelerator position signal;

resetting means for detecting the output voltage of the power supply and for generating a reset signal to reset said electronic control system when the output voltage of the power supply is cut off;

counter means for counting a first predetermined period of time after said electronic control system is reset by the reset signal;

memory means for storing the vehicle speed data occurring immediately before the output voltage of the power supply is cut off; and control means for supplying the vehicle speed data and the accelerator position signal to said gear position determining means, and for supplying the vehicle speed data stored in said memory means and the accelerator position signal to said gear position determining means during the first predetermined period of time counted by said counter means.

2. An electronic control system according to claim 1, wherein said gear position determining means includes means for determining a neutral gear position during a second predetermined period of time less than the first predetermined period of time and immediately after said electronic control system is reset by the reset signal.

3. An electronic control system according to claim 1, wherein said memory means comprises a backup RAM.

4. An electronic control system according to claim 1, wherein said control means includes:

determination means for determining whether the vehicle speed data stored in said memory means has one of a normal value and an abnormal value, and means for supplying the vehicle speed data stored in said memory means to said gear position determining means when the vehicle speed data is detected to have the normal value by said determination means and for supplying a predetermined high vehicle speed value to said gear position determining means when the vehicle speed data is detected to have the abnormal value by said determination means.

* * * * *